(12) United States Patent
Ozawa et al.

(10) Patent No.: US 9,418,583 B2
(45) Date of Patent: Aug. 16, 2016

(54) TRANSMISSION DEVICE, RECEPTION DEVICE, TRANSMISSION-RECEPTION SYSTEM, AND IMAGE DISPLAY SYSTEM

(75) Inventors: Seiichi Ozawa, Wako (JP); Hironobu Akita, Chiyoda-ku (JP)

(73) Assignee: THINE ELECTRONICS, INC., Tokyo (JP)

( * ) Notice: Subject to any disclaimer, the term of this patent is extended or adjusted under 35 U.S.C. 154(b) by 405 days.

(21) Appl. No.: 13/517,462

(22) PCT Filed: Dec. 13, 2010

(86) PCT No.: PCT/JP2010/072359
§ 371 (c)(1),
(2), (4) Date: Aug. 23, 2012

(87) PCT Pub. No.: WO2011/077986
PCT Pub. Date: Jun. 30, 2011

(65) Prior Publication Data
US 2012/0306845 A1 Dec. 6, 2012

(30) Foreign Application Priority Data
Dec. 21, 2009 (JP) .................... 2009-289338

(51) Int. Cl.
*G09G 5/00* (2006.01)
*G09G 3/20* (2006.01)
(Continued)

(52) U.S. Cl.
CPC ............... *G09G 3/20* (2013.01); *G09G 3/3611* (2013.01); *G09G 2300/0426* (2013.01); *G09G 2310/08* (2013.01); *G09G 2370/08* (2013.01); *H04L 25/0264* (2013.01)

(58) Field of Classification Search
CPC .................. G09G 2300/0426; G09G 2310/08; G09G 2370/08; G09G 3/20; G09G 3/3611; H04L 25/0264

USPC ..................... 345/87, 204, 99–100, 213, 214; 715/219
See application file for complete search history.

(56) References Cited

U.S. PATENT DOCUMENTS

| 7,242,397 B2 | 7/2007 | Iseki et al. | |
| 7,919,975 B2 * | 4/2011 | Ryu | G09G 3/006 324/760.01 |

(Continued)

FOREIGN PATENT DOCUMENTS

| CN | 101273395 A | 9/2008 |
| JP | 08-022268 A | 1/1996 |

(Continued)

OTHER PUBLICATIONS

Office Action issued by Japanese Patent Office in Japanese Patent Application No. 2009-289338 mailed Mar. 18, 2014.
(Continued)

*Primary Examiner* — Quan-Zhen Wang
*Assistant Examiner* — Tony Davis
(74) *Attorney, Agent, or Firm* — Sughrue Mion, PLLC (57) ABSTRACT

Reception devices $20_1$ to $20_N$ are arranged one-dimensionally in this order. The reception device $20_n$ has a data input buffer 21, a first clock input buffer $22_1$, and a first clock output buffer $23_1$. The first clock input buffer $22_1$ buffers a clock input to the first clock terminals $P_{21}$ and $P_{22}$, and outputs it to the first clock output buffer $23_1$. The first clock output buffer $23_1$ buffers a clock input from the first clock input buffer $22_1$ and outputs it from the second clock terminals $P_{31}$ and $P_{32}$. The data input terminals $P_{11}$ and $P_{12}$ are located between the first clock terminal and the second clock terminal.

20 Claims, 8 Drawing Sheets

(51) Int. Cl.
*G09G 3/36* (2006.01)
*H04L 25/02* (2006.01)

(56) References Cited

U.S. PATENT DOCUMENTS

| | | | | |
|---|---|---|---|---|
| 8,582,628 B2* | 11/2013 | Ozawa | ............... | G09G 3/2096 375/219 |
| 9,019,259 B2* | 4/2015 | Ozawa | ............... | G09G 3/3611 345/214 |
| 2002/0080107 A1* | 6/2002 | Fujimoto et al. | ............... | 345/87 |
| 2005/0152189 A1* | 7/2005 | Kim et al. | ............... | 365/185.29 |
| 2006/0002483 A1* | 1/2006 | Kim | ............... | H04L 25/085 375/257 |
| 2006/0256099 A1* | 11/2006 | Tashiro | ............... | G09G 3/2092 345/204 |
| 2006/0290641 A1* | 12/2006 | Ku | ............... | G09G 3/20 345/98 |
| 2007/0030232 A1* | 2/2007 | Minami | ............... | G09G 5/006 345/98 |
| 2007/0146231 A1 | 6/2007 | Hamahashi et al. | | |
| 2008/0246755 A1* | 10/2008 | Lee | ............... | G09G 3/20 345/214 |
| 2008/0250167 A1* | 10/2008 | Kuroda | ............... | G06F 13/385 710/31 |
| 2008/0291181 A1 | 11/2008 | Nam et al. | | |
| 2009/0115477 A1* | 5/2009 | Lin | ............... | G09G 3/20 327/161 |
| 2009/0207895 A1* | 8/2009 | Park | ............... | G11C 7/1003 375/219 |
| 2009/0245010 A1* | 10/2009 | Searles et al. | ............... | 365/230.06 |
| 2009/0274241 A1* | 11/2009 | Tsao | ............... | G09G 3/3611 375/295 |
| 2010/0166127 A1* | 7/2010 | Jang | ............... | H04L 7/0008 375/354 |
| 2010/0225620 A1* | 9/2010 | Lee | ............... | G09G 3/20 345/204 |
| 2011/0037758 A1* | 2/2011 | Lim | ............... | H03L 7/0805 345/213 |
| 2011/0317747 A1* | 12/2011 | Ozawa | ............... | G09G 3/2096 375/219 |
| 2012/0068995 A1* | 3/2012 | Ozawa | ............... | G09G 3/3611 345/214 |

FOREIGN PATENT DOCUMENTS

| | | |
|---|---|---|
| JP | 2000-029419 A | 1/2000 |
| JP | 2001-282171 A | 10/2001 |
| JP | 2004-233713 A | 8/2004 |
| JP | 2007-171592 A | 7/2007 |
| JP | 2007-212543 A | 8/2007 |
| JP | 2008-216924 A | 9/2008 |
| JP | 2009-251524 A | 10/2009 |
| JP | 2009-271303 A | 11/2009 |
| JP | 2010-258671 A | 11/2010 |
| JP | 5017348 B2 | 9/2012 |
| JP | 5670622 B2 | 2/2015 |
| KR | 100562860 B1 | 3/2006 |
| WO | 2007/035015 A1 | 3/2007 |
| WO | 2009/045029 A2 | 4/2009 |

OTHER PUBLICATIONS

Richard I. McCartney, Marshall J. Bell, "A third-generation timing controller and column-driver architecture using point-to-point differential signaling", Journal of the Society for Information Display, vol. 13, Issue 2, Feb. 2005, p. 91-97.
Office Action issued by Chinese Patent Office in Chinese Application No. 201080058169.2 mailed Apr. 3, 2014.
Office Action issued by Korean Patent Office in Korean Application No. 10-2012-7014803 mailed Dec. 10, 2013.
Search Report issued in European Application No. 10839219.2 dated Jul. 12, 2013.
Edward Yi, "Drive your large LCD with PPDS", EE Times Asia, http://www.eetasia.com/STATIC/PDF/200804/EEOL__ 2008APR01_OPT_CTRLD_TA_01.pdf?SOURCES=DOWNLOAD.
Communication dated May 19, 2015, issued by the Japan Patent Office in corresponding Japanese Application No. 2009-289338.
Communication dated Dec. 8, 2014 from the Intellectual Property Office of Taiwan in counterpart application No. 099144234.

* cited by examiner

TRANSMISSION DEVICE, RECEPTION DEVICE, TRANSMISSION-RECEPTION SYSTEM, AND IMAGE DISPLAY SYSTEM

CROSS REFERENCE TO RELATED APPLICATIONS

This application is a National Stage of International Application No. PCT/JP2010/072359 filed Dec. 13, 2010, claiming priority based on Japanese Patent Application No. 2009-289338 filed Dec. 21, 2009, the contents of all of which are incorporated herein by reference in their entirety.

TECHNICAL FIELD

The present invention relates to a transmission device, a reception device, a transmission-reception system, and an image display system.

BACKGROUND ART

An image display system such as a liquid crystal display system includes a transmission device, a reception device, and an image display unit, transmits image data and a clock to the reception device from the transmission device having received an image signal from outside, samples the image data with the clock in the reception device, outputs the image data obtained by the sampling to a signal line, and displays an image on the image display unit based on the image data output to the signal line. In such the image display system such as the liquid crystal display system, generally, the above-mentioned transmission device or a device including it is referred to as a "timing controller", and the above-mentioned reception device or a device including it is referred to as a "driver".

In a transmission-reception system which transmits data and a clock from a single transmission device to each of a plurality of reception devices arranged one-dimensionally, as with the case of such an image display system, the transmission device needs to output data individually to each reception device, whereas, with regard to the clock, the transmission device may output clocks individually to respective reception devices, or the transmission device may output a common clock to respective reception devices (see Patent Literature 1). Compared with the former case, the latter case is preferred in that the number of wirings for clock transmission-reception between a transmission device and a plurality of reception devices can be reduced.

CITATION LIST

Patent Literature

Patent Literature 1: Japanese Patent Laid-Open No. 2009-271303

SUMMARY OF INVENTION

Technical Problem

However, there is a limit in raising the clock frequency when the transmission device outputs a common clock to respective reception devices since degradation of the wave pattern of clocks received by the reception device becomes large, and therefore there is also a limit in increasing the bit rate of data transmission.

It is an object of the present invention, which has been made to overcome the above-mentioned problems, to provide a transmission device and a reception device which can reduce the number of wirings for clock transmission between the transmission device and a plurality of the reception devices and perform high-speed data transmission. In addition, it is also an object to provide a transmission-reception system having such a transmission device and reception device, and an image display system having such a transmission device, a reception device, and an image display unit.

Solution to Problem

A transmission device according to the present invention, which transmits a clock and data to each of N reception devices arranged one-dimensionally, is characterized in that (1) it includes data output terminals which output data individually to each of the N reception devices, and a first clock output terminal which outputs a common clock to p reception devices arranged successively among the N reception devices, wherein (2) the data output terminals corresponding to each of the N reception devices are arranged in the same order as the order of arrangement of the N reception devices, and (3) the first clock output terminal is located at a first direction side of all the data output terminals corresponding to each of the p reception devices, with no data output terminals interposed in-between that correspond to reception devices other than the p reception devices among the N reception devices. Here, N and p are integers equal to or larger than two.

A reception device according to the present invention is characterized in that (1) it includes a data input terminal which receives data from outside, a first clock terminal which receives a clock from outside, a first buffer circuit which buffers and outputs the clock input to the first clock terminal, and a second clock terminal which outputs the clock output from the first buffer circuit to outside, wherein (2) the data input terminal is located between the first clock terminal and the second clock terminal.

Given the foregoing, a transmission-reception system according to the present invention is characterized in that (1) it includes the transmission device according to the present invention and the N reception devices arranged one-dimensionally according to the present invention, wherein (2) the data input terminals of each of the N reception devices receive data output from the corresponding data output terminals among data output terminals arranged in the same order as the order of arrangement of the N reception devices in the transmission device, (3) location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, (4) the first clock terminal of a reception device at the end of the first direction side among the p reception devices receives a clock output from the first clock output terminal of the transmission device, and (5) the second clock terminal of a reception device among the p reception devices and the first clock terminal of a reception device adjacent thereto are connected to each other, and whereby the p reception devices are cascade-connected with regard to a clock.

Respective signal lines of data and clock between the transmission device and the reception device may be physically a single line, or may be a pair of lines which transmit differential data such as LVDS (Low-Voltage Differential Signaling).

In addition, the transmission device according to the present invention is preferred that (1) it further includes a second clock output terminal which outputs a common clock to q reception devices arranged successively other than the p reception devices among the N reception devices, wherein (2) the second clock output terminal is located at a second direction side of all the data output terminals corresponding to each of the q reception devices, with no data output terminals interposed in-between that correspond to reception devices other than the q reception devices among the N reception devices, and (3) the first clock output terminal and the second clock output terminal are located between all the data output terminals corresponding to each of the p reception devices and all the data output terminals corresponding to each of the q reception devices. Here, q is an integer equal to or larger than two. The reception device according to the present invention is preferred that it further includes a second buffer circuit which buffers a clock input to the second clock terminal and outputs the clock from the first clock terminal, and selection means which selectively causes either the first buffer circuit or the second buffer circuit to operate.

Given the foregoing, a transmission-reception system according to the present invention is characterized in that (1) it includes the transmission device according to the present invention and the N reception devices arranged one-dimensionally according to the present invention, wherein (2) the data input terminals of each of the N reception devices receive data output from the corresponding data output terminals among the data output terminals arranged in the same order as the order of arrangement of the N reception devices in the transmission device, (3) location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, (4) the first clock terminal of a reception device at the end of the first direction side among the p reception devices receives a clock output from the first clock output terminal of the transmission device, (5) the second clock terminal of a reception device among the p reception devices and the first clock terminal of a reception device adjacent thereto are connected to each other, and whereby the p reception devices are cascade-connected with regard to a clock, (6) location of the second clock terminal with respect to the data input terminals in each of the q reception devices arranged successively other than the p reception devices among the N reception devices is at the same second direction side as the location of the second clock output terminal with respect to the data output terminals corresponding to each of the q reception devices in the transmission device, (7) the second clock terminal of a reception device at the end of the second direction side among the q reception devices receives a clock output from the second clock output terminal of the transmission device, and (8) the first clock terminal of a reception device among the q reception devices and the second clock terminal of a reception device adjacent thereto are connected to each other, and whereby the q reception devices are cascade-connected with regard to a clock.

In addition, the transmission device according to the present invention is preferred that (1) it further includes data input terminals which receive data output from each of the p reception devices, wherein (2) the data input terminals are located at either the side of all the data output terminals corresponding to each of the p reception devices or the side of the first clock output terminal. The reception device according to the present invention is preferred that (1) it further includes a first data terminal and a second data terminal which receive data from outside or output data to outside, wherein (2) the data input terminal, the first clock terminal, and the second clock terminal are located between the first data terminal and the second data terminal.

Given the foregoing, a transmission-reception system according to the present invention is characterized in that (1) it includes the transmission device according to the present invention and the N reception devices arranged one-dimensionally according to the present invention, wherein (2) the data input terminals of each of the N reception devices receive data output from the corresponding data output terminals among data output terminals arranged in the same order as the order of arrangement of the N reception devices in the transmission device, (3) location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, (4) the first clock terminal of a reception device at the end of the first direction side among the p reception devices receives a clock output from the first clock output terminal of the transmission device, (5) the second clock terminal of a reception device among the p reception devices and the first clock terminal of a reception device adjacent thereto are connected to each other, and whereby the p reception devices are cascade-connected with regard to a clock, and (6) the second data terminal of a reception device among the p reception devices and the first data terminal of a reception device adjacent thereto are connected to each other.

In addition, the transmission device according to the present invention is preferred that (1) it further includes data input terminals which receive data output from each of the p reception devices, wherein (2) the data input terminals are located between all the data output terminals corresponding to each of the p reception devices and the first clock output terminal, or located at the opposite side of the first clock output terminal with respect to all the data output terminals corresponding to each of the p reception devices. The reception device according to the present invention is preferred that (1) it further includes a first data terminal and a second data terminal which receive data from outside or output data to outside, wherein (2) the first data terminal is located between the first clock terminal and the data input terminal, and (3) the second data terminal is located between the second clock terminal and the data input terminal.

Given the foregoing, a transmission-reception system according to the present invention is characterized in that (1) it includes the transmission device according to the present invention and the N reception devices arranged one-dimensionally according to the present invention, wherein (2) the data input terminals of each of the N reception devices receive data output from the corresponding data output terminals among data output terminals arranged in the same order as the order of arrangement of the N reception devices in the transmission device, (3) location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, (4) the first clock terminal of a reception device at the end of the first direction side among the p reception devices receives a clock output from the first clock output terminal of the transmission device, (5) the second clock terminal of a reception device among the p reception devices and the first clock terminal of a reception device adjacent thereto are connected to each other, and whereby the p reception devices are cascade-connected with regard to a clock, and (6) the second data terminal of a reception device among the p reception devices and the first data terminal of a reception device adjacent thereto are connected to each other.

In addition, the transmission device according to the present invention is preferred to include a control unit which adjusts a phase difference between data output from the data output terminals corresponding to each of the p reception devices and a clock output from the first clock output terminal. The reception device according to the present invention is preferred to output, from the first data terminal or the second data terminal, data relating to a phase difference between data input to the data input terminal and a clock input to the clock input terminal.

Given the foregoing, a transmission-reception system according to the present invention is characterized in that (1) it includes the transmission device according to the present invention and the N reception devices arranged one-dimensionally according to the present invention, wherein (2) the data input terminals of each of the N reception devices receive data output from the corresponding data output terminals among data output terminals arranged in the same order as the order of arrangement of the N reception devices in the transmission device, (3) location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, (4) the first clock terminal of a reception device at the end of the first direction side among the p reception devices receives a clock output from the first clock output terminal of the transmission device, (5) the second clock terminal of a reception device among the p reception devices and the first clock terminal of a reception device adjacent thereto are connected to each other, and whereby the p reception devices are cascade-connected with regard to a clock, (6) the second data terminal of a reception device among the p reception devices and the first data terminal of a reception device adjacent thereto are connected to each other, and (7) the control unit of the transmission device adjusts the phase difference between data output from the data output terminals corresponding to each of the p reception devices and a clock output from the first clock output terminal, based on data relating to a phase difference output from the first data terminal or the second data terminal of each of the p reception devices.

An image display system according to the present invention is characterized in that it includes the transmission-reception system according to the present invention, and an image display unit which displays images based on data received by each of N reception devices included in the transmission-reception system.

Advantageous Effects of Invention

According to the present invention, the number of wirings for clock transmission between a transmission device and a plurality of reception devices can be reduced and high-speed transmission can also be realized.

DESCRIPTION OF EMBODIMENTS

In the following, embodiments for implementing the present invention will be described in detail, referring to accompanying drawings. In the description of the drawings, same reference numerals are provided to same elements, with overlapping description thereof being omitted.

Figure 1:
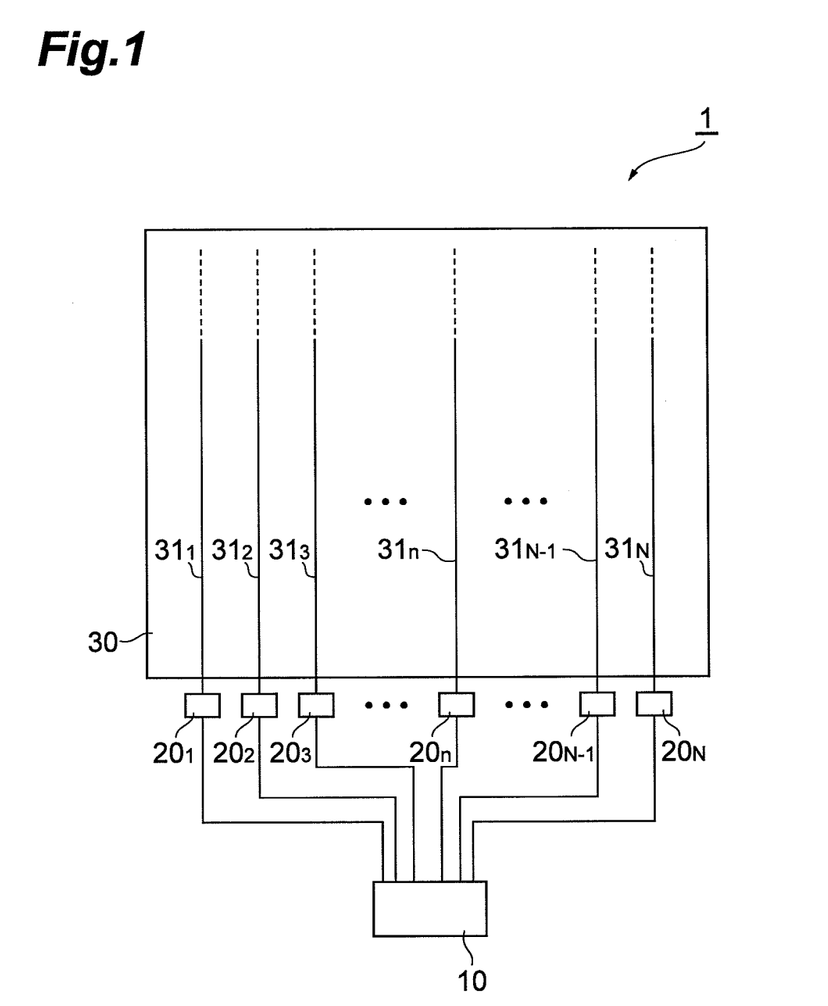
FIG. 1 illustrates an overall configuration of an image display system 1.

FIG. 1 illustrates an overall configuration of an image display system 1 according to the present embodiment. The image display system 1 shown in the figure includes a transmission device 10, N reception devices $20_1$ to $20_N$, and an image display unit 30. Here, N is an integer equal to or larger than two, and n appearing in the following is an integer not less than one and not more than N. In the drawing, drive units and signal lines for vertical scanning of images in the image display unit 30 are not shown.

The transmission device 10 receives an image signal from outside, and transmits the image data and a clock to each of the N reception devices $20_1$ to $20_N$. Each reception device $20_n$ receives the image data and the clock which have been output from the transmission device 10 and reached thereto, samples the image data with the clock, and outputs the image data obtained by the sampling to a signal line $31_1$ of the image display unit 30. The image display unit 30, which is a liquid crystal panel, for example, displays an image based on image data provided to the signal line $31_n$ from each reception device $20_n$. There may be one or more signal lines $31_n$.

Figure 2:
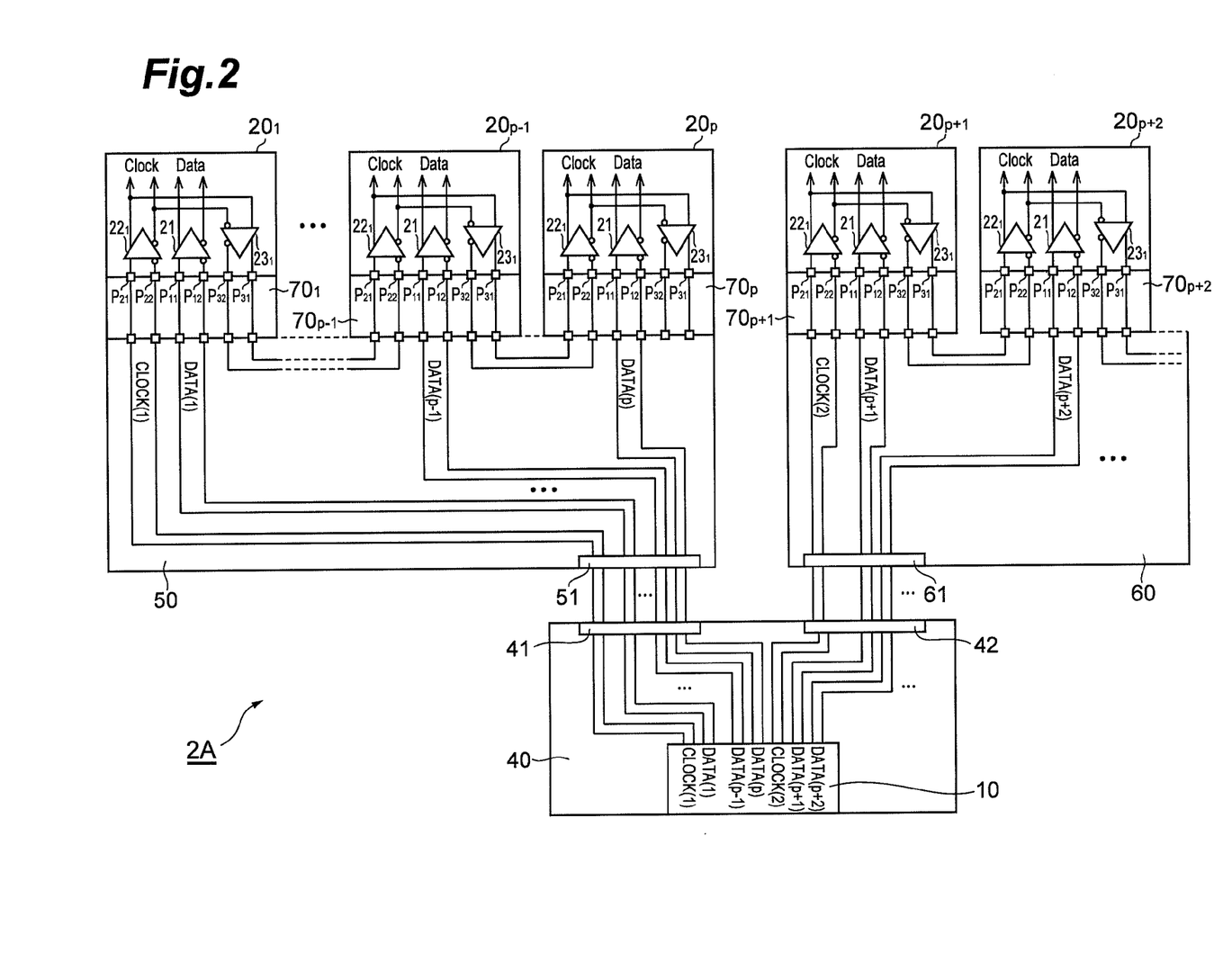
FIG. 2 illustrates a configuration of a transmission-reception system 2A including a transmission device 10 and N reception devices $20_1$ to $20_N$.

FIG. 2 illustrates a configuration of a transmission-reception system 2A including the transmission device 10 and the N reception devices $20_1$ to $20_N$. The N reception devices $20_1$ to $20_N$, having a common configuration, are arranged one-dimensionally in this order. The transmission device 10 and each of the N reception devices $20_1$ to $20_N$ include an integrated circuit formed on a semiconductor substrate, and also include an external terminal for electrical connection between the integrated circuit and an external device.

The transmission device 10 is provided on a wiring substrate 40. An external terminal of the transmission device 10 is electrically connected to two connectors 41 and 42 mounted on one side of the wiring substrate 40 by wiring on the wiring substrate 40. The connector 41 of the wiring substrate 40 is electrically connected to a connector 51 of a wiring substrate 50. In addition, the connector 42 of the wiring substrate 40 is electrically connected to a connector 61 of a wiring substrate 60.

Reception devices $20_1$ to $20_p$ among the N reception devices $20_1$ to $20_N$ are electrically connected to a wiring on the wiring substrate 50, via a wiring on cables $70_1$ to $70_p$, at a side opposite to the side on which the connector 51 of the wiring substrate 50 is mounted. Reception devices $20_{p+1}$ to $20_N$ are electrically connected to a wiring on the wiring substrate 60, via a wiring on cables $70_{p+1}$ to $70_N$, at a side opposite to the side on which the connector 61 of the wiring substrate 60 is mounted. p is an integer equal to or larger than two.

Figure 3:
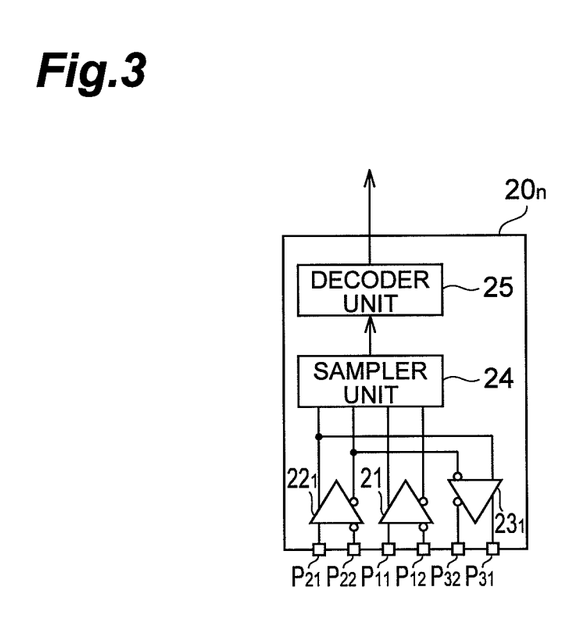
FIG. 3 illustrates a configuration of a reception device 20.

FIG. 3 illustrates a configuration of the reception device $20_n$. The reception device $20_n$ includes a data input buffer 21, a first clock input buffer $22_1$, a first clock output buffer $23_1$, a sampler unit 24, and a decoder unit 25. The data input buffer 21 buffers the data input to data input terminals $P_{11}$ and $P_{12}$ as a differential signal, and outputs the data to the sampler unit 24.

The first clock input buffer $22_1$ buffers the clock input to first clock terminals $P_{21}$ and $P_{22}$ as a differential signal, and outputs the clock to the sampler unit 24, as well as to the first clock output buffer $23_1$. The first clock output buffer $23_1$ buffers the clock input from the first clock input buffer $22_1$, and outputs the clock from second clock terminals $P_{31}$ and $P_{32}$ as a differential signal. As shown in FIGS. 2 and 3, the data input terminals $P_{11}$ and $P_{12}$ are located between the first clock terminals $P_{21}$, $P_{22}$ and the second clock terminals $P_{31}$, $P_{32}$ in each reception device $20_n$.

The sampler unit 24 samples the data output from the data input buffer 21 with the clock output from the first clock input buffer $22_1$, and outputs the data obtained by the sampling to the decoder unit 25. The decoder unit 25 decodes the data output from the sampler unit 24 and transmits the data to the signal line $31_n$.

As shown in FIG. 2, the transmission device 10 includes a data output terminal which outputs data DATA (n) individually to each reception device $20_n$. The transmission device 10 includes a first clock output terminal which outputs a common clock CLOCK (1) to the p reception devices $20_1$ to $20_p$ arranged successively among the N reception devices $20_1$ to $20_N$. In addition, the transmission device 10 includes a second clock output terminal which outputs a common clock CLOCK (2) to reception devices $20_{p+1}$ to $20_N$ arranged successively among the N reception devices $20_1$ to $20_N$.

In the transmission device 10, data output terminals corresponding to each of the N reception devices $20_1$ to $20_N$ are arranged in the same order as the order of arrangement of the N reception devices $20_1$ to $20_N$. The first clock output terminal which outputs the clock CLOCK (1) is located at a first direction side (left side in FIG. 2) of all the data output terminals corresponding to each of the reception devices $20_1$ to $20_p$, with no data output terminals interposed in-between that correspond to other reception devices. In addition, the second clock output terminal which outputs the clock CLOCK (2) is located at the first direction side (left side in FIG. 2) of all the data output terminals corresponding to each of the reception devices $20_{p+1}$ to $20_N$, with no data output terminals interposed in-between that correspond to other reception devices.

The data input terminals $P_{11}$ and $P_{12}$ of each reception device $20_n$ receive data DATA (n) output from corresponding data output terminals among the data output terminals arranged in the same order as the order of arrangement of the N reception devices $20_1$ to $20_N$ in the transmission device 10, via the wiring substrate 40, the wiring substrates 50 or the wiring substrate 60, and a cable $70_n$.

Locations of the first clock terminals $P_{21}$ and $P_{22}$ with respect to the data input terminals $P_{11}$ and $P_{12}$ in each of the reception devices $20_1$ to $20_p$ are at the same first direction side (left side in FIG. 2) as the location of the first clock output terminal with respect to the data output terminals corresponding to each of the reception devices $20_1$ to $20_p$ in the transmission device 10. Similarly, locations of the first clock terminals $P_{21}$ and $P_{22}$ with respect to the data input terminals $P_{11}$ and $P_{12}$ in each of the reception devices $20_{p+1}$ to $20_N$ are at the same first direction side (left side in FIG. 2) as the location of the second clock output terminal with respect to the data output terminals corresponding to each of the reception devices $20_{p+1}$ to $20_N$ in the transmission device 10.

The first clock terminals $P_{21}$ and $P_{22}$ of the reception device $20_1$ at the end of the first direction side (left side in FIG. 2) among the reception devices $20_1$ to $20_p$ receive the clock CLOCK (1) output from the first clock output terminal of the transmission device 10. The second clock terminals $P_{31}$ and $P_{32}$ of the reception device $20_n$ among the reception devices $20_1$ to $20_p$ and the first clock terminals $P_{21}$ and $P_{22}$ of the reception device $20_{n+1}$ adjacent thereto are connected to each other, and whereby the reception devices $20_1$ to $20_p$ are cascade-connected with regard to a clock CLOCK (1).

Similarly, the first clock terminals $P_{21}$ and $P_{22}$ of the reception device $20_{p+1}$ at the end of the first direction side (left side in FIG. 2) among the reception devices $20_{p+1}$ to $20_N$ receive the clock CLOCK (2) output from the second clock output terminal of the transmission device 10. The second clock terminals $P_{31}$ and $P_{32}$ of the reception device $20_n$ among the reception devices $20_{p+1}$ to $20_N$ and the first clock terminals $P_{21}$ and $P_{22}$ of the reception device $20_{n+1}$ adjacent thereto are connected to each other, and whereby the reception devices $20_{p+1}$ to $20_N$ are cascade-connected with regard to a clock CLOCK (2).

With the configuration of the transmission-reception system 2A shown in FIG. 2, since the common clock CLOCK (1) is provided from the transmission device 10 to the reception devices $20_1$ to $20_p$ and additionally the common clock CLOCK (2) is provided from the transmission device 10 to the reception devices $20_{p+1}$ to $20_N$, the number of wirings for clock transmission between the transmission device 10 and the reception devices $20_1$ to $20_N$ is reduced. In addition, since the clock input to a reception device $20_n$ can be buffered and output, and provided to the adjacent reception device $20_{n+1}$, degradation of the wave pattern of the clocks is suppressed, and whereby it becomes possible to raise the clock frequency and, additionally, increase the bit rate of data transmission.

Furthermore, since there is no crossing of wirings for data transmission or clock transmission between the transmission device 10 and the reception devices $20_1$ to $20_N$, inexpensive substrates with fewer conductive layers can be used as the wiring substrates 40, 50 and 60 therebetween.

Figure 4:
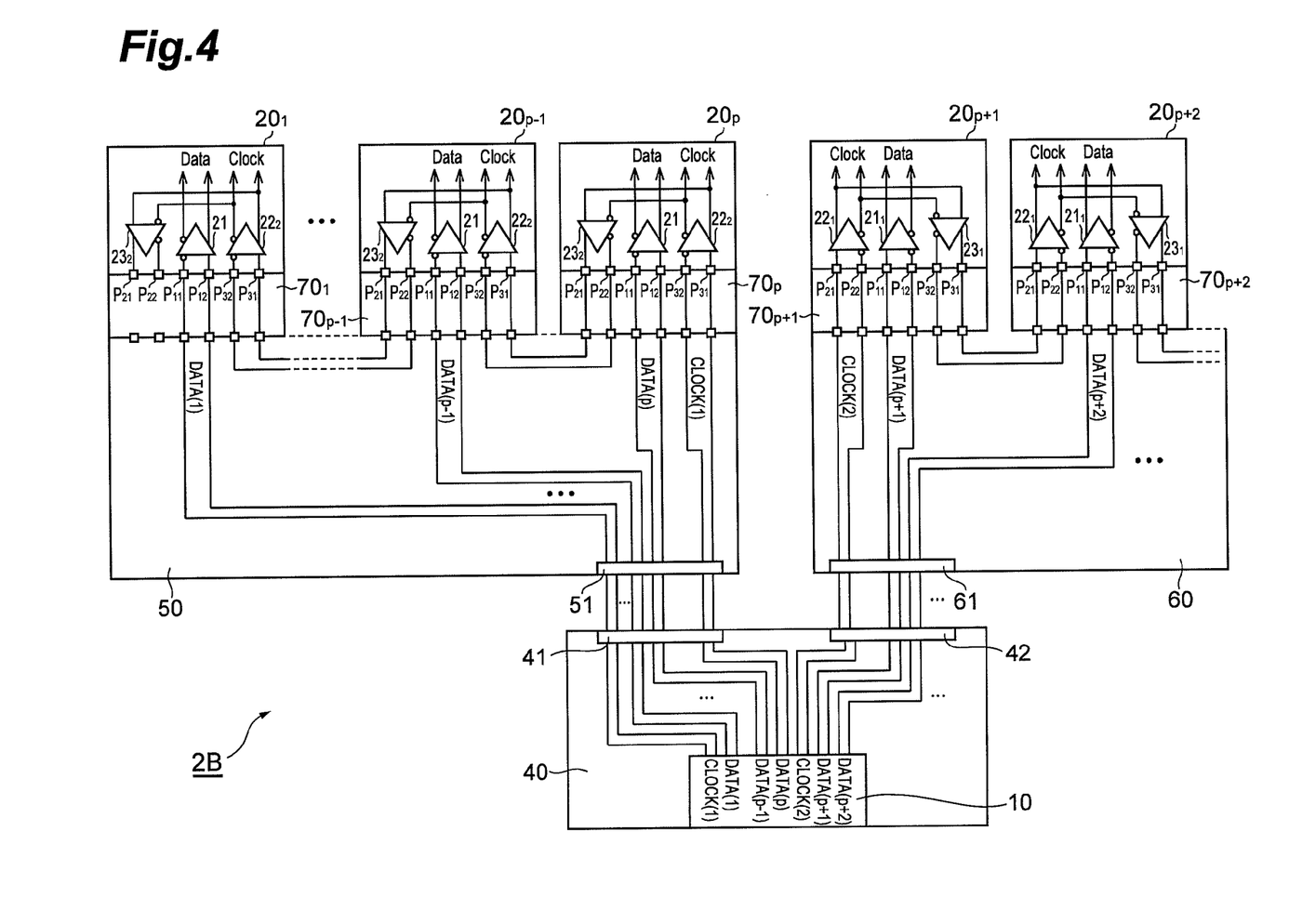
FIG. 4 illustrates a configuration of a transmission-reception system 2B including the transmission device 10 and the N reception devices $20_1$ to $20_N$.

FIG. 4 illustrates a configuration of a transmission-reception system 2B including the transmission device 10 and the N reception devices $20_1$ to $20_N$. Compared with the configuration of the transmission-reception system 2A shown in FIG. 2, the configuration of the transmission-reception system 2B shown in FIG. 4 differs in the configuration of the reception devices $20_1$ to $20_p$ and also differs in the order of arrangement of the external terminals connected to the reception devices $20_1$ to $20_p$ among the external terminals of the transmission device 10.

Each of the reception devices $20_1$ to $20_p$ has a data input buffer 21, a second clock input buffer $22_2$, a second clock output buffer $23_2$, the sampler unit 24, and the decoder unit 25. In each of the reception devices $20_1$ to $20_p$, the second clock input buffer $22_2$ buffers the clock input to the second clock terminals $P_{31}$ and $P_{32}$ as a differential signal, and outputs the clock to the sampler unit 24, and also to the second clock output buffer $23_2$. Additionally, in each of the reception devices $20_1$ to $20_p$, the second clock output buffer $23_2$ buffers the clock input from the second clock input buffer $22_2$, and outputs the clock from the first clock terminals $P_{21}$ and $P_{22}$ as a differential signal. In each of the reception devices $20_1$ to $20_p$, the data input terminals $P_{11}$ and $P_{12}$ are located between the first clock terminals $P_{21}$, $P_{22}$ and the second clock terminals $P_{31}$, $P_{32}$.

In the transmission device 10, data output terminals corresponding to each of the N reception devices $20_1$ to $20_N$ are arranged in the same order as the order of arrangement of the N reception devices $20_1$ to $20_N$. The first clock output terminal which outputs the clock CLOCK (1) is located at the first direction side (right side in FIG. 4) of all the data output terminals corresponding to each of the reception devices $20_1$ to $20_p$, with no data output terminals interposed in-between that correspond to other reception devices. In addition, the second clock output terminal which outputs the clock CLOCK (2) is located at the second direction side (left side in FIG. 4) of all the data output terminals corresponding to each of the reception devices $20_{p+1}$ to $20_N$, with no data output terminals interposed in-between that correspond to other reception devices. The first clock output terminal and the second clock output terminal are located between all the data output terminals corresponding to each of the reception devices $20_1$ to $20_p$ and all the data output terminals corresponding to each of the reception devices $20_{p+1}$ to $20_N$.

The data input terminals $P_{11}$ and $P_{12}$ of each reception device $20_n$ receive data DATA (n) output from corresponding data output terminals among the data output terminals arranged in the same order as the order of arrangement of the N reception devices $20_1$ to $20_N$ in the transmission device 10, via the wiring substrate 40, the wiring substrates 50 or the wiring substrate 60, and the cable $70_n$.

Locations of the second clock terminals $P_{31}$ and $P_{32}$ with respect to the data input terminals $P_{11}$ and $P_{12}$ in each of the reception devices $20_1$ to $20_p$ are at the same first direction side (right side in FIG. 4) as the location of the first clock output terminal with respect to the data output terminals corresponding to each of the reception devices $20_1$ to $20_p$ in the transmission device 10. Similarly, locations of the first clock terminal $P_{21}$ and $P_{22}$ with respect to the data input terminals $P_{11}$ and $P_{12}$ in each of the reception devices $20_{p+1}$ to $20_N$ are at the same second direction side (left side in FIG. 4) as the location of the second clock output terminal with respect to the data output terminals corresponding to each of the reception devices $20_{p+1}$ to $20_N$ in the transmission device 10.

The second clock terminals $P_{31}$ and $P_{32}$ of the reception device $20_p$ at the end of the first direction side (right side in FIG. 4) among the reception devices $20_1$ to $20_p$ receive the clock CLOCK (1) output from the first clock output terminal of the transmission device 10. The first clock terminals $P_{21}$ and $P_{22}$ of the reception device $20_n$ among the reception devices $20_1$ to $20_p$ and the second clock terminals $P_{31}$ and $P_{32}$ of the reception device $20_{n-1}$ adjacent thereto are connected to each other, and whereby the reception devices $20_1$ to $20_p$ are cascade-connected with regard to a clock CLOCK (1).

The first clock terminals $P_{21}$ and $P_{22}$ of the reception device $20_{p+1}$ at the end of the second direction side (left side in FIG. 4) of the reception devices $20_{p+1}$ to $20_N$ receive the clock CLOCK (2) output from the second clock output terminal of the transmission device 10. The second clock terminals $P_{31}$ and $P_{32}$ of the reception device $20_n$ among the reception devices $20_{p+1}$ to $20_N$ and the first clock terminals $P_{21}$ and $P_{22}$ of the reception device $20_{n+1}$ adjacent thereto are connected to each other, and whereby the reception devices $20_{p+1}$ to $20_N$ are cascade-connected with regard to a clock CLOCK (2).

Also with the configuration of the transmission-reception system 2B shown in FIG. 4, since the common clock CLOCK (1) is provided from the transmission device 10 to the reception devices $20_1$ to $20_p$, and additionally the common clock CLOCK (2) is provided from the transmission device 10 to the reception devices $20_{p+1}$ to $20_N$, the number of wirings for clock transmission between the transmission device 10 and the reception devices $20_1$ to $20_N$ is reduced. In addition, since a clock input to the reception device $20_n$ is buffered and output to be provided to the adjacent reception device $20_{n-1}$ or $20_{n+1}$, degradation of the wave pattern of the clock is suppressed, and whereby it becomes possible to raise the clock frequency and, additionally, increase the bit rate of data transmission.

Furthermore, since there is no crossing of wirings for data transmission or clock transmission between the transmission device 10 and the reception devices $20_1$ to $20_N$, inexpensive substrates with fewer conductive layers can be used as the wiring substrates 40, 50 and 60 therebetween. Particularly, since wiring of the clock CLOCK (1) can be made shorter in the configuration shown in FIG. 4 than the configuration shown in FIG. 2, it also becomes possible to suppress degradation of the wave pattern of clocks, raise the clock frequency, and increase the bit rate of data transmission.

Figure 5:
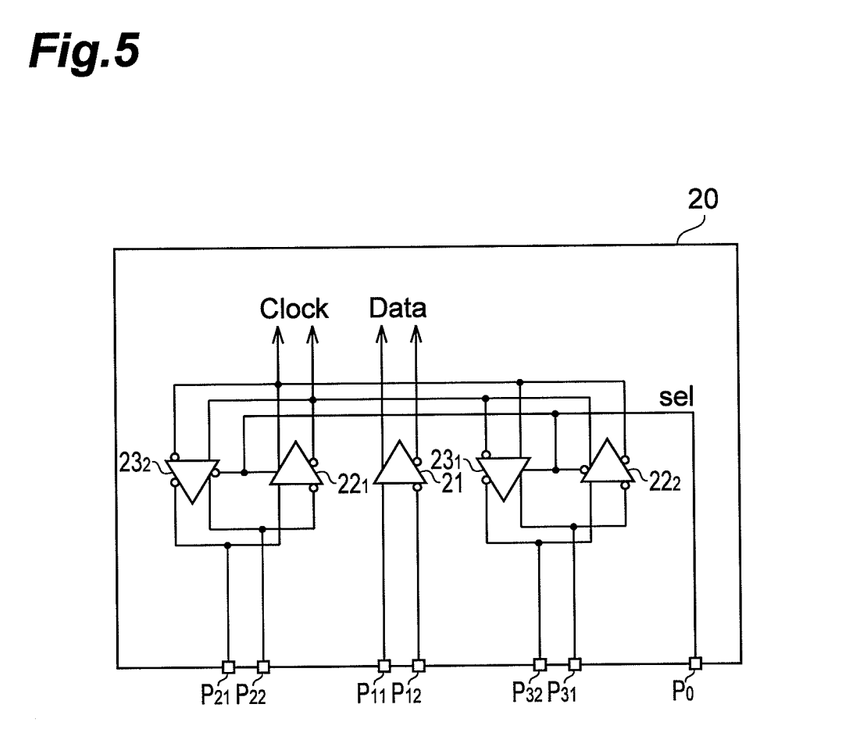
FIG. 5 illustrates a configuration of a reception device 20.

Although the configuration of the reception devices $20_1$ to $20_p$ and the configuration of the reception devices $20_{p+1}$ to $20_N$ may be different from each other, they can be made common by providing the configuration shown in FIG. 5. The reception device $20_n$ shown in the drawing includes the data input buffer 21, the first clock input buffer $22_1$, the second clock input buffer $22_2$, the first clock output buffer $23_1$, the second clock output buffer $23_2$, the sampler unit 24, and the decoder unit 25.

The input terminal of the first clock input buffer $22_1$ and the output terminal of the second clock output buffer $23_2$ are connected to the first clock terminals $P_{21}$ and $P_{22}$. The input terminal of the second clock input buffer $22_2$ and the output terminal of the first clock output buffer $23_1$ are connected to the second clock terminals $P_{31}$ and $P_{32}$. The output terminal of the first clock input buffer $22_1$, the input terminal of the first clock output buffer $23_1$, the output terminal of the second clock input buffer $22_2$, and the input terminal of the second clock output buffer $23_2$ are connected to each other.

The first clock input buffer $22_1$ and the first clock output buffer $23_1$ are in an operable state when an SEL signal input to a terminal $P_0$ is at a high-level, and in a halt state when the SEL signal is at a low-level. The second clock input buffer $22_2$ and the second clock output buffer $23_2$ are in an operable state when the SEL signal input to the terminal $P_0$ is at the low-level and in a halt state when the SEL signal is at the high-level.

The reception device $20_n$ configured as described above has selection means which selectively causes either the first clock input buffer $22_1$ and the first clock output buffer $23_1$ or the second clock input buffer $22_2$ and the second clock output buffer $23_2$ to operate. In other words, the reception device $20_n$ is used as the reception devices $20_{p+1}$ to $20_N$ in FIG. 4 when the SEL signal is at the high-level, and used as the reception devices $20_1$ to $20_p$ in FIG. 4 when the SEL signal is at the low-level.

Figure 6:
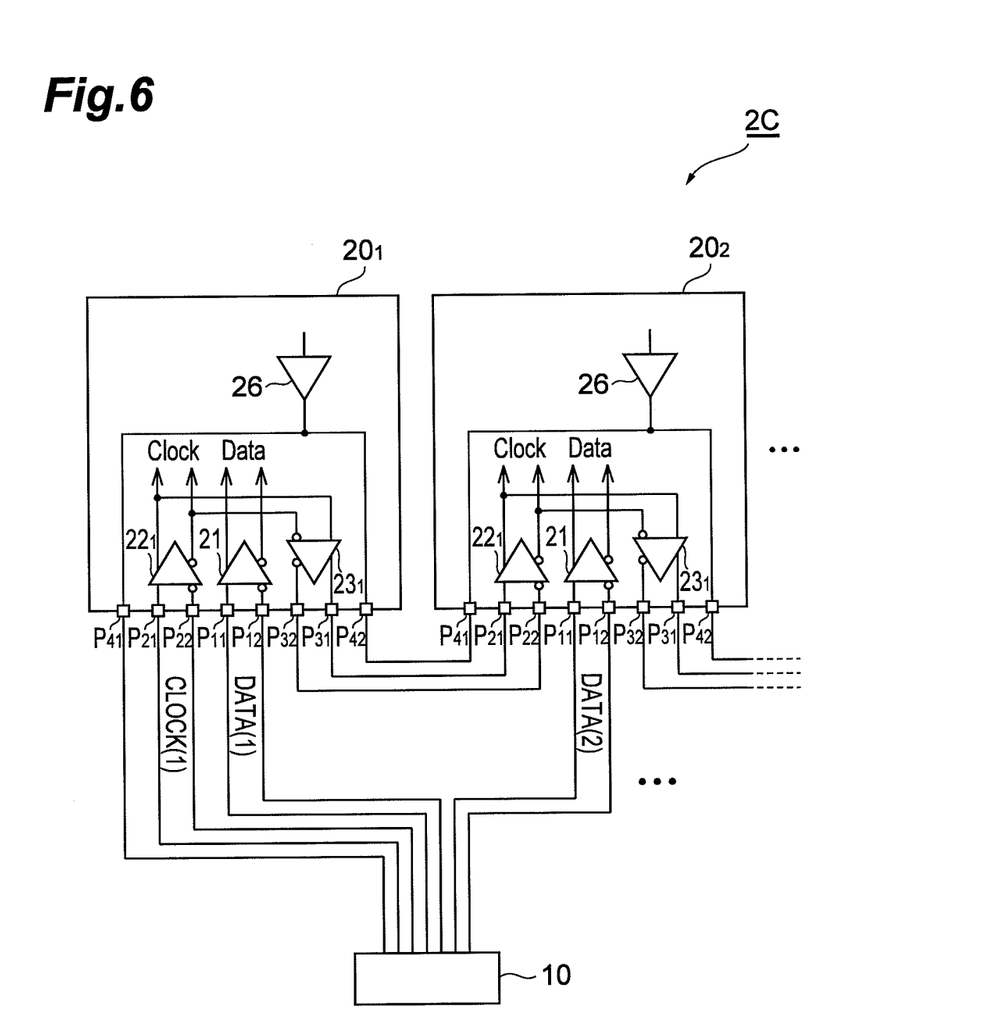
FIG. 6 illustrates a configuration of a transmission-reception system 2C including the transmission device 10 and the N reception devices $20_1$ to $20_N$.

FIG. 6 illustrates a configuration of a transmission-reception system 2C including the transmission device 10 and the N reception devices $20_1$ to $20_N$. Compared with the configuration of the transmission-reception system 2A shown in FIG. 2, the configuration of the transmission-reception system 2C shown in this FIG. 6 is different in that data is transmitted from each reception device $20_n$ to the transmission device 10 and, additionally, in that an external terminal for transmission-reception of the data is provided in the transmission device 10 and each reception device $20_n$. In FIG. 6, wiring substrates and cables between the transmission device 10 and each reception device $20_n$ are not shown.

Each reception devices $20_n$ further includes a transmission unit 26, a first data terminal $P_{41}$, and a second data terminal $P_{42}$. The output terminal of the transmission unit 26 is connected to both the first data terminal $P_{41}$ and the second data terminal $P_{42}$. The transmission unit 26 of each reception device $20_n$ outputs information relating to the reception condition of data or clock in the reception device $20_n$ (e.g., data sampled by the sampler unit 24, phase difference between data and clock, size of the amplitude of data, duty of data or clock). The data input terminals $P_{11}$ and $P_{12}$, the first clock terminals $P_{21}$ and $P_{22}$, and the second clock terminals $P_{31}$ and $P_{32}$ are located between the first data terminal $P_{41}$ and the second data terminal $P_{42}$.

The transmission device 10 includes a data output terminal which outputs data DATA (n) individually to each reception device $20_g$. The transmission device 10 includes a first clock output terminal which outputs the common clock CLOCK (1) to the p reception devices $20_1$ to $20_p$ arranged successively among the N reception devices $20_1$ to $20_N$. In addition, the transmission device 10 further includes a data input terminal which receives data output from the transmission unit 26 of each of the reception devices $20_1$ to $20_p$, and performs required adjustment to improve reception condition of data or clock in each of the reception devices $20_1$ to $20_p$ (e.g., adjustment of phase difference between data and clock, adjustment of size of amplitude of data, adjustment of duty of data or clock), based on the data input to the data input terminal.

In the transmission device 10, data output terminals corresponding to each of the N reception devices $20_1$ to $20_N$ are arranged in the same order as the order of arrangement of the N reception devices $20_1$ to $20_N$. The first clock output terminal which outputs the clock CLOCK (1) is located at the first direction side (left side in FIG. 6) of all the data output terminals corresponding to each of the reception devices $20_1$ to $20_p$, with no data output terminals interposed in-between that correspond to other reception devices. The data input terminals for receiving data output from each of the reception devices $20_1$ to $20_p$ are located at either the side (left side in FIG. 6) of all the data output terminals corresponding to each of the reception devices $20_1$ to $20_p$ or the side of the first clock output terminal.

The second data terminal $P_{42}$ of the reception device $20_n$ among the reception devices $20_1$ to $20_p$ and the first data terminal $P_{41}$ of the reception device $20_{n+1}$ adjacent thereto are connected to each other, and whereby the reception devices $20_1$ to $20_p$ are cascade-connected with regard to the data output from the transmission unit 26 of each reception device $20_n$. The first data terminal $P_{41}$ of the reception devices $20_1$ at the end of the first direction side (left side in FIG. 6) of the reception devices $20_1$ to $20_p$ outputs, to the transmission device 10, the data output from the transmission unit 26 of each reception device $20_n$.

The configuration of the transmission-reception system 2C shown in FIG. 6 can also exert an effect which is similar to the case of the transmission-reception system 2A shown in FIG. 2. Particularly, with the configuration of the transmission-reception system 2C shown in FIG. 6, reception condition of data or clock in each reception device $20_n$ can be improved by performing required adjustment in the transmission device 10 based on the data to be transmitted from each reception device $20_n$ to the transmission device 10.

Figure 7:
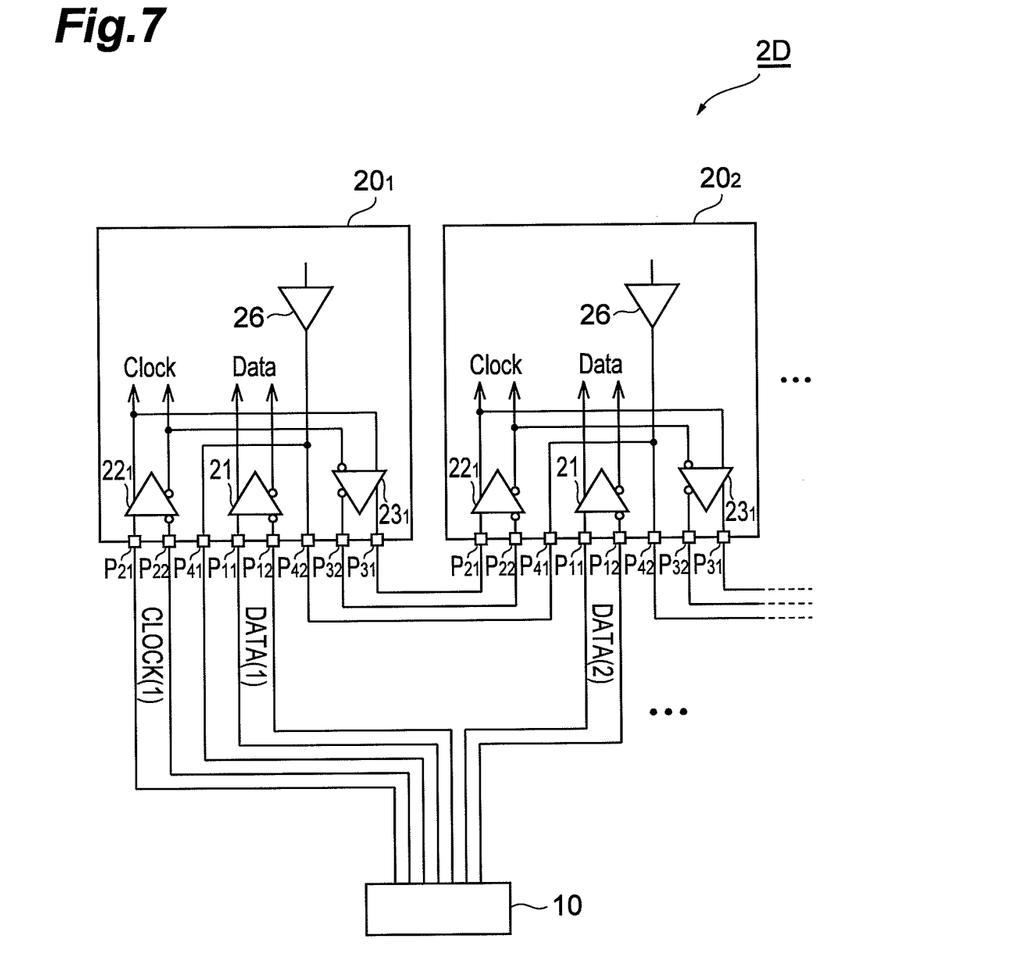
FIG. 7 illustrates a configuration of a transmission-reception system 2D including the transmission device 10 and the N reception devices $20_1$ to $20_N$.

FIG. 7 illustrates a configuration of a transmission-reception system 2D including the transmission device 10 and the N reception devices $20_1$ to $20_N$. Compared with the configuration of the transmission-reception system 2C shown in FIG. 6, the configuration of the transmission-reception system 2D shown in this FIG. 7 differs in the order of arrangement of external terminals in the transmission device 10 and each reception device $20_n$. Also in FIG. 7, wiring substrates and cables between the transmission device 10 and each reception device $20_n$ are not shown.

In the transmission-reception system 2D, the first data terminal $P_{41}$ is located between the first clock terminals $P_{21}$, $P_{22}$ and the data input terminals $P_{11}$, $P_{12}$ in each reception device $20_n$. In addition, the second data terminal $P_{42}$ is located between the second clock terminals $P_{31}$, $P_{32}$ and the data input terminals $P_{11}$, $P_{12}$. The data input terminals for receiving data output from each of the reception devices $20_1$ to $20_p$ are located between all the data output terminals corresponding to the reception devices $20_1$ to $20_p$ and the first clock output terminal in the transmission device 10. Alternatively, the data input terminals may be located at the opposite side of the first clock output terminal for all the data output terminals corresponding to each of the reception devices $20_1$ to $20_p$.

The second data terminal $P_{42}$ of the reception devices $20_n$ among the reception devices $20_1$ to $20_p$ and the first data terminal $P_{41}$ of the reception device $20_{n+1}$ adjacent thereto are connected to each other, and whereby the reception devices $20_1$ to $20_p$ are cascade-connected with regard to the data output from the transmission unit 26 of each reception device $20_n$. The first data terminal $P_{41}$ of the reception device $20_1$ at the end of the first direction side (left side in FIG. 6) of the reception devices $20_1$ to $20_p$ outputs, to the transmission device 10, the data output from the transmission unit 26 of each reception device $20_n$.

The configuration of the transmission-reception system 2D shown in FIG. 7 can also exert an effect which is similar to the case of the transmission-reception system 2C shown in FIG. 6.

Figure 8:
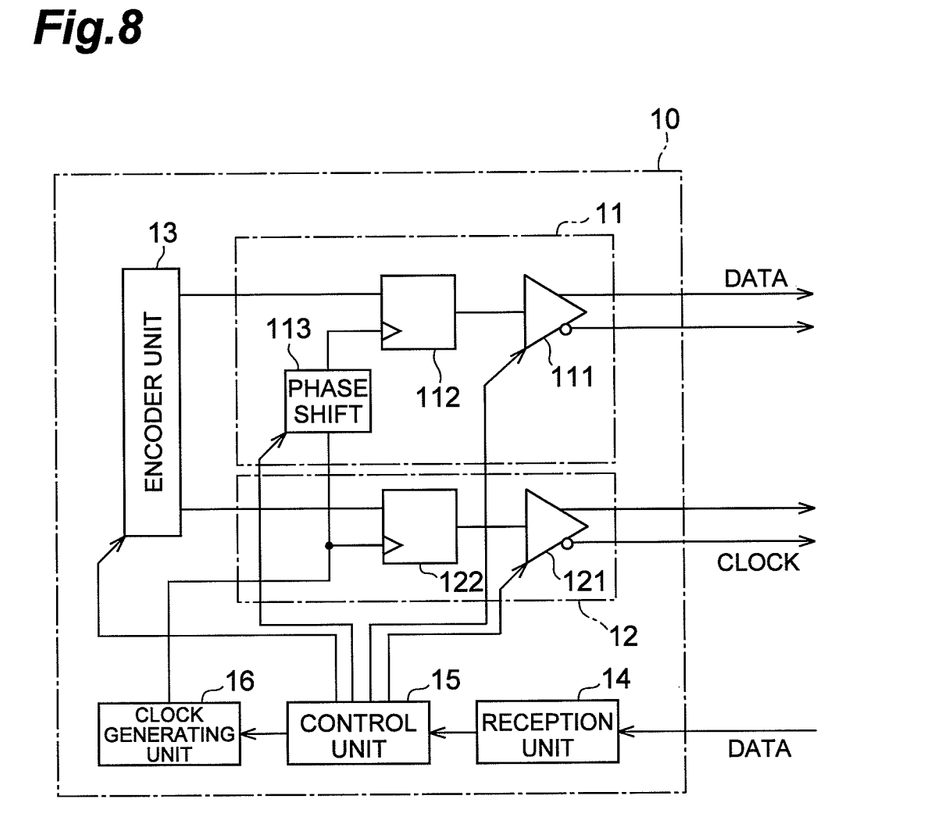
FIG. 8 illustrates a configuration of the transmission device 10 included in the transmission-reception system 2C or the transmission-reception system 2D.

FIG. 8 illustrates a configuration of the transmission device 10 included in the transmission-reception system 2C or the transmission-reception system 2D. The transmission device 10 includes a data transmission unit 11, a clock transmission unit 12, an encoder unit 13, a receiving unit 14, a control unit 15, and a clock generating unit 16. Although the transmission device 10 includes N data transmission units 11 in correspondence with the N reception devices $20_1$ to $20_N$, only a single data transmission unit 11 is shown in the drawing. In addition, the order of arrangement of external terminals of the transmission device 10 is of no concern in the drawing.

The encoder unit 13 of the transmission device 10, being controlled by the control unit 15, provides the data transmission unit 11 with data to be transmitted to the reception device $20_n$, and also provides the clock transmission unit 12 with clocks to be transmitted to the reception device $20_n$.

The data transmission unit 11, which is supposed to transmit data to the reception devices $20_n$, includes a buffer 111, a flip-flop 112, and a phase shift unit 113. The phase shift unit 113 receives a reference clock signal output from the clock generating unit 16, shifts the phase of the reference clock by a phase shift amount instructed from the control unit 15, and outputs it to the flip-flop 112. The flip-flop 112 latches the data output from the encoder unit 13 at a timing indicated by a clock output from the phase shift unit 113, and outputs the latched data to the buffer 111. The buffer 111 performs adjustment of the amplitude and offset instructed from the control unit 15 for the data output from the flip-flop 112, and transmits the adjusted data to the reception device $20_n$.

The clock transmission unit 12, which is supposed to transmit clocks to the reception device $20_n$, includes a buffer 121 and a flip-flop 122. The flip-flop 122 latches the clock output from the encoder unit 13 at a timing indicated by a reference clock output from the clock generating unit 16, and outputs the latched data to the buffer 121. The buffer 121 performs adjustment of the amplitude and offset instructed from the control unit 15 for the data output from the flip-flop 112, and transmits the adjusted data to the reception device $20_n$.

The reception unit 14 receives the data sent from the transmission unit 26 of the reception device $20_n$ via the first data terminal $P_{41}$ or the second data terminal $P_{42}$. The control unit 15 controls data transmission by the data transmission unit 11 and clock transmission by the clock transmission unit 12. Specifically, the control unit 15 controls the data provided from the encoder unit 13 to the data transmission unit 11. The control unit 15 adjusts the phase between the data transmitted by data transmission unit 11 and the clock transmitted by the clock transmission unit 12 based on the data received by the reception unit 14, by controlling the phase shift amount of the reference clock in the phase shift unit 113 of the data transmission unit 11. In addition, the control unit 15 adjusts the amplitude and duty of the data transmitted from the buffer 111 of the data transmission unit 11 and adjusts the duty of the clock transmitted from the buffer 121 of the clock transmission unit 12, based on the data received by the reception unit 14.

Particularly, in the present embodiment, since a clock is propagated from a reception device to its adjacent reception device, which increases the clock delay in reception devices of subsequent stages, the control unit 14 adjusts the phase between the data output to each reception device $20_n$ and the common clock. In addition, it is preferred that the control unit 14 controls the amplitude or duty of the data, or duty of the clock.

INDUSTRIAL APPLICABILITY

The present invention can be applied to applications which reduce the number of wirings for clock transmission between a transmission device and a plurality of reception devices, and perform high-speed data transmission.

REFERENCE SIGNS LIST 1 image display system
2A to 2D transmission-reception system
10 transmission device
11 data transmission unit
12 clock transmission unit
13 encoder unit
14 reception unit
15 control unit
16 clock generating unit
20 reception device
21 data input buffer
$22_1$ first clock input buffer
$22_2$ second clock input buffer
$23_1$ first clock output buffer
$23_2$ second clock output buffer
24 sampler unit
25 decoder unit
26 transmission unit 26

The invention claimed is:

1. A transmission device which transmits a clock and data to each of N reception devices arranged one-dimensionally, comprising:
    data output terminals which output data individually to each of the N reception devices, and a first clock output terminal which outputs a common clock to a reception device of p reception devices arranged successively among the N reception devices, the reception device successively outputting the common clock to the remainder of the p reception devices in a serial fashion, and
    a control unit which adjusts a phase difference between data output from the data output terminals corresponding to each of the p reception devices and a clock output from the first clock output terminal, wherein
    the data output terminals corresponding to each of the N reception devices are arranged in a same order as the order of arrangement of the N reception devices,
    the first clock output terminal is located at a first direction side of all the data output terminals corresponding to each of the p reception devices, with no data output terminals interposed in-between that correspond to reception devices other than the p reception devices among the N reception devices, and
    N and p are integers equal to or larger than two.

2. The transmission device according to claim 1, further comprising a second clock output terminal which outputs a common clock to q reception devices arranged successively other than the p reception devices among the N reception devices, wherein
    the second clock output terminal is located at a second direction side of all the data output terminals corresponding to each of the q reception devices, with no data output terminals interposed in-between that correspond to reception devices other than the q reception devices among the N reception devices, and
    the first clock output terminal and the second clock output terminal are located between all the data output terminals corresponding to each of the p reception devices and all the data output terminals corresponding to each of the q reception devices (q is an integer equal to or larger than two).

3. A transmission-reception system comprising the transmission device according to claim 2 and the N reception devices are arranged one-dimensionally and comprise:
    a data input terminal which receives data from outside, a first clock terminal which receives a clock from outside, a first buffer circuit which buffers and outputs the clock input to the first clock terminal, and a second clock terminal which outputs the clock output from the first buffer circuit to outside, and
    a second buffer circuit which buffers a clock input to the second clock terminal and outputs the clock from the first clock terminal, and selection means which selectively causes either the first buffer circuit or the second buffer circuit to operate,
    wherein
    the data input terminals of each of the N reception devices receive data output from the corresponding data output terminals among the data output terminals arranged in the same order as the order of arrangement of the N reception devices in the transmission device,
    location of the first clock terminal with respect to the data input terminals in each of the p reception devices arranged successively among the N reception devices is at the same first direction side as the location of the first clock output terminal with respect to the data output terminals corresponding to each of the p reception devices in the transmission device,
    the first clock terminal of a reception device at the end of the first direction side among the p reception devices receives a clock output from the first clock output terminal of the transmission device,
    the second clock terminal of a reception device among the p reception devices and the first clock terminal of a reception device adjacent thereto are connected to each other, and whereby the p reception devices are cascade-connected with regard to a clock, location of the second clock terminal with respect to the data input terminals in each of the q reception devices arranged successively other than the p reception devices among the N reception devices is at the same second direction side as the location of the second clock output terminal with respect to the data output terminals corresponding to each of the q reception devices in the transmission device, the second clock terminal of a reception device at the end of the second direction side among the q reception devices receives a clock output from the second clock output terminal of the transmission device, the first clock terminal of a reception device among the q reception devices and the second clock terminal of a reception device adjacent thereto are connected to each other, and whereby the q reception devices are cascade-connected with regard to a clock, and the data input terminal is located between the first clock terminal and the second clock terminal.

4. An image display system comprising the transmission-reception system according to claim 3, and an image display unit which displays images based on data received by each of N reception devices included in the transmission-reception system.

5. The transmission device according to claim 1, further comprising data input terminals which receive data output from each of the p reception devices, wherein the data input terminals are located at either the side of all the data output terminals corresponding to each of the p reception devices or the side of the first clock output terminal.

6. A transmission-reception system comprising the transmission device according to claim 5 and the N reception devices are arranged one-dimensionally and comprise:

a data input terminal which receives data from outside, a first clock terminal which receives a clock from outside, a first buffer circuit which buffers and outputs the clock input to the first clock terminal, and a second clock terminal which outputs the clock output from the first buffer circuit to outside, and a first data terminal and a second data terminal which receive data from outside or output data to outside, wherein the data input terminals of each of the N reception devices receive data output from the corresponding data output terminals among data output terminals arranged in the same order as the order of arrangement of the N reception devices in the transmission device, location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, the first clock terminal of a reception device at the end of the first direction side among the p reception devices receives a clock output from the first clock output terminal of the transmission device, the second clock terminal of a reception device among the p reception devices and the first clock terminal of a reception device adjacent thereto are connected to each other, and whereby the p reception devices are cascade-connected with regard to a clock, the second data terminal of a reception device among the p reception devices and the first data terminal of a reception device adjacent thereto are connected to each other, the data input terminal is located between the first clock terminal and the second clock terminal, and the data input terminal, the first clock terminal, and the second clock terminal are located between the first data terminal and the second data terminal.

7. An image display system comprising the transmission-reception system according to claim 6, and an image display unit which displays images based on data received by each of N reception devices included in the transmission-reception system.

8. The transmission device according to claim 1, further comprising data input terminals which receive data output from each of the p reception devices, wherein the data input terminals are located between all the data output terminals corresponding to each of the p reception devices and the first clock output terminal, or located at the opposite side of the first clock output terminal with respect to all the data output terminals corresponding to each of the p reception devices.

9. A transmission-reception system comprising the transmission device according to claim 8 and the N reception devices are arranged one-dimensionally and comprise:

a data input terminal which receives data from outside, a first clock terminal which receives a clock from outside, a first buffer circuit which buffers and outputs the clock input to the first clock terminal, and a second clock terminal which outputs the clock output from the first buffer circuit to outside, and a first data terminal and a second data terminal which receive data from outside or output data to outside, wherein the data input terminals of each of the N reception devices receive data output from the corresponding data output terminals among data output terminals arranged in the same order as the order of arrangement of the N reception devices in the transmission device, location of the first clock terminal with respect to the data input terminals in each of the p reception devices arranged successively among the N reception devices is at the same first direction side as the location of the first clock output terminal with respect to the data output terminals corresponding to each of the p reception devices in the transmission device, the first clock terminal of a reception device at the end of the first direction side among the p reception devices receives a clock output from the first clock output terminal of the transmission device, the second clock terminal of a reception device among the p reception devices and the first clock terminal of a reception device adjacent thereto are connected to each other, and whereby the p reception devices are cascade-connected with regard to a clock, the second data terminal of a reception device among the p reception devices and the first data terminal of a reception device adjacent thereto are connected to each other the data input terminal is located between the first clock terminal and the second clock terminal, the first data terminal is located between the first clock terminal and the data input terminal, and the second data terminal is located between the second clock terminal and the data input terminal.

10. An image display system comprising the transmission-reception system according to claim 9, and an image display unit which displays images based on data received by each of N reception devices included in the transmission-reception system.

11. A transmission-reception system comprising the transmission device according to claim 1 and the N reception devices are arranged one-dimensionally and comprise:
a data input terminal which receives data from outside, a first clock terminal which receives a clock from outside, a first buffer circuit which buffers and outputs the clock input to the first clock terminal, and a second clock terminal which outputs the clock output from the first buffer circuit to outside,
wherein
the data input terminals of each of the N reception devices receive data output from the corresponding data output terminals among the data output terminals arranged in the same order as the order of arrangement of the N reception devices in the transmission device,
location of the first clock terminal with respect to the data input terminals in each of the p reception devices arranged successively among the N reception devices is at the same first direction side as the location of the first clock output terminal with respect to the data output terminals corresponding to each of the p reception devices in the transmission device,
the first clock terminal of a reception device at the end of the first direction side among the p reception devices receives a clock output from the first clock output terminal of the transmission device,
the second clock terminal of a reception device among the p reception devices and the first clock terminal of a reception device adjacent thereto are connected to each other, and whereby the p reception devices are cascade-connected with regard to a clock, and
the data input terminal is located between the first clock terminal and the second clock terminal.

12. An image display system comprising the transmission-reception system according to claim 11, and
an image display unit which displays images based on data received by each of N reception devices included in the transmission-reception system.

13. A transmission-reception system comprising the transmission device according to claim 1 and the N reception devices are arranged one-dimensionally and comprise:
a data input terminal which receives data from outside, a first clock terminal which receives a clock from outside, a first buffer circuit which buffers and outputs the clock input to the first clock terminal, and a second clock terminal which outputs the clock output from the first buffer circuit to outside, and
a first data terminal and a second data terminal which receive data from outside or output data to outside,
wherein
the data input terminals of each of the N reception devices receive data output from the corresponding data output terminals among data output terminals arranged in the same order as the order of arrangement of the N reception devices in the transmission device,
location of the first clock terminal with respect to the data input terminals in each of the p reception devices arranged successively among the N reception devices is at the same first direction side as the location of the first clock output terminal with respect to the data output terminals corresponding to each of the p reception devices in the transmission device,
the first clock terminal of a reception device at the end of the first direction side among the p reception devices receives a clock output from the first clock output terminal of the transmission device,
the second clock terminal of a reception device among the p reception devices and the first clock terminal of a reception device adjacent thereto are connected to each other, and whereby the p reception devices are cascade-connected with regard to a clock,
the second data terminal of a reception device among the p reception devices and the first data terminal of a reception device adjacent thereto are connected to each other,
the control unit of the transmission device adjusts the phase difference between data output from the data output terminals corresponding to each of the p reception devices and a clock output from the first clock output terminal, based on data relating to a phase difference output from the first data terminal or the second data terminal of each of the p reception devices
the data input terminal is located between the first clock terminal and the second clock terminal,
the data input terminal, the first clock terminal, and the second clock terminal are located between the first data terminal and the second data terminal, and
data relating to a phase difference between data input to the data input terminal and a clock input to the clock input terminal is output from the first data terminal or the second data terminal.

14. An image display system comprising the transmission-reception system according to claim 13, and
an image display unit which displays images based on data received by each of N reception devices included in the transmission-reception system.

15. A reception device comprising a data input terminal which receives data from outside,
a first clock terminal which receives a clock from outside,
a first buffer circuit which buffers and outputs the clock input to the first clock terminal, and
a second clock terminal which outputs the clock output from the first buffer circuit to outside the reception device,
wherein the data input terminal is located between the first clock terminal and the second clock terminal,
further comprising a second buffer circuit which buffers a clock input to the second clock terminal and outputs the clock from the first clock terminal, and selection means which selectively causes either the first buffer circuit or the second buffer circuit to operate.

16. The reception device according to claim 15, further comprising a first data terminal and a second data terminal which receive data from outside or output data to outside, wherein
the data input terminal, the first clock terminal, and the second clock terminal are located between the first data terminal and the second data terminal.

17. The reception device according to claim 15, further comprising a first data terminal and a second data terminal which receive data from outside or output data to outside, wherein
the first data terminal is located between the first clock terminal and the data input terminal, and
the second data terminal is located between the second clock terminal and the data input terminal.

18. The reception device according to claim 17, wherein data relating to a phase difference between data input to the data input terminal and a clock input to the clock input terminal is output from the first data terminal or the second data terminal.

19. The reception device according to claim 17, wherein data relating to a phase difference between data input to the data input terminal and a clock input to the clock terminal is output from the first data terminal or the second data terminal.

20. The reception device according to claim 16, wherein data relating to a phase difference between data input to the data input terminal and a clock input to the clock input terminal is output from the first data terminal or the second data terminal.

* * * * *